United States Patent
Tanibuchi et al.

[11] Patent Number: 5,985,054
[45] Date of Patent: Nov. 16, 1999

[54] AGE PRECIPITATION-CONTAINING RARE EARTH METAL-NICKEL ALLOY

[75] Inventors: Yuji Tanibuchi, Himeji; Kazuhiko Yamamoto; Chikara Okada, both of Kobe, all of Japan

[73] Assignee: Santoku Metal Ind. Co., Ltd., Japan

[21] Appl. No.: 09/204,317

[22] Filed: Dec. 3, 1998

Related U.S. Application Data

[62] Division of application No. 08/669,447, filed as application No. PCT/JP95/02255, Nov. 6, 1995.

[30] Foreign Application Priority Data

Nov. 7, 1994 [JP] Japan .................................. 6-296018

[51] Int. Cl.$^6$ .................................................. C22C 19/03
[52] U.S. Cl. ........................... 148/409; 420/455; 429/223
[58] Field of Search .................................. 148/406, 426; 420/455; 429/223

[56] References Cited

U.S. PATENT DOCUMENTS

| | | | |
|---|---|---|---|
| 4,609,599 | 9/1986 | Percheron nee Guegan et al. | 420/455 |
| 5,441,826 | 8/1995 | Watanabe et al. | 429/101 |
| 5,512,385 | 4/1996 | Komori et al. | 429/101 |
| 5,654,115 | 8/1997 | Hasebe et al. | 429/218 |

*Primary Examiner*—Deborah Yee
*Attorney, Agent, or Firm*—Keil & Weinkauf

[57] ABSTRACT

An age precipitation-containing rare earth metal-nickel alloy of $AB_5$ type having a composition represented by a formula (1)

$$R(Ni_{1-x}M_x)_{5+y} \qquad (1)$$

wherein R stands for a rare earth element including Y or mixtures thereof, M stands for Co, Al, Mn, Fe, Cu, Zr, Ti, Mo, W, B, or mixtures thereof, x satisfies the relation of $0.05 \leq x \leq 0.5$, and y satisfies the relation of $-0.45 \leq y \leq 0.45$, the alloy containing a precipitated phase having an average size of 0.1 to 20 μm as measured along the longitudinal axis. A method of producing the alloy as defined above including the steps of subjecting a raw alloy material having a composition represented by the formula (1) to a solid solution treatment at a temperature of not less than 1000° C., and ageing the alloy material subjected to said solution heat treatment at a temperature T (° C.) of not less than 700° C. and less than 1000° C. for a time period t (hour) which satisfies the relation represented by the formula (2)

$$(830-T)/200 \leq \log t \leq (1200-T)/200 \qquad (2),$$

thereby precipitating a precipitated phase having an average size of 0.1 to 20 μm as measured along the longitudinal axis.

7 Claims, 5 Drawing Sheets

AGE PRECIPITATION-CONTAINING RARE EARTH METAL-NICKEL ALLOY

This is a divisional application of application Ser. No. 08/669,447, field Jul. 3, 1996 which was a U.S. national stage application of PCT/JP 95/02255 filed on Nov. 6, 1995, now allowed.

FIELD OF ART

This invention relates to an age precipitation-containing rare earth metal-nickel alloy which exhibits high capacity and long life when it is used for a hydrogen storage vessel, a heat pump, and an anode material for a nickel-hydrogen rechargeable battery, and a method of producing the same as well as an anode for nickel-hydrogen rechargeable battery.

BACKGROUND OF THE INVENTION

An anode of nickel-hydrogen rechargeable batteries which are currently produced in a large amount is mainly produced with an Mm (misch metal) —Ni—Co—Mn—Al alloy of $AB_5$ type. This alloy has the properties of larger hydrogen storage capacity than other alloys, and a usable hydrogen absorption-desorption pressure of 1 to 5 atmosphere at ordinary temperature.

However, conventional $AB_5$ type rare earth metal-nickel alloy has drawbacks of expanding and contracting due to the absorption and desorption of hydrogen, thereby generating cracks and being pulverized to deteriorate the electrical properties thereof.

Alternatively, electrodes having still larger electrical capacity are demanded. In order to increase the electrical capacity of electrodes, an alloy has been developed having a composition wgherein the atomic ratio of transition metals containing nickel as a main ingredient to rare earth metals is 4.5 to 5:1, thereby increasing the content of rare earth metals.

However, the electrical capacity of this alloy is increased at a sacrifice of the long life. This alloy also has a drawback in that in mass-producing the alloy of such composition through a conventional melting method and a mold casting method, segregations rich in rare earth metals tend to be formed, which can be a starting point of cracks and corrosion.

For the purpose of preventing the formation of such segregations rich in rare earth metals, Japanese Laid-open Patent Application No. 2-220356, for example discloses a method for producing a homogeneous alloy by injecting an alloy melt onto a copper roller rotating at a high speed to rapidly quench and solidify the alloy melt. Further, Japanese Laid-open Patent Application No. 6-73466 discloses 2 to 5 hour-annealing of an alloy which has been rapidly quenched and solidified at 550 to 950° C. in vacuum or an inert gas atmosphere for releasing cooling strain occurred by the rapid quenching and solidification. According to these two methods, improvements in the homogeneity of the alloy, as well as corrosion resistance and cell life are recognized.

However, sufficient improvement in electrical capacity is not recognized by the above method. Therefore, an alloy which achieves both high electrical capacity and long life is not practically known yet.

By the way, it is an accepted theory that a rare earth metal-nickel alloy having the above-mentioned $AB_5$ type structure does not have a solid solution range (T. B. Massalski et al.: Binary Alloy Phase Diagrams, Vol. 2. 1468 ASM (1986)). Also, an $AB_6$ type rare earth metal-nickel alloy containing fine precipitated phases in the crystal grains thereof is not known. Still less, it is not known that such fine precipitated phases can be a factor of improving both electrical capacity and cell life when the above-mentioned alloy is used in the anode of a nickel-hydrogen rechargeable battery.

DISCLOSURE OF THE INVENTION

It is an object of the present invention to provide an age precipitation-containing rare earth metal-nickel alloy and a method of producing the same which can improve both high electrical capacity and long life at the same time, as compared to the conventional rare earth metal-nickel alloys which can be used as an anode material for a nickel-hydrogen rechargeable battery.

It is another object of the present invention to provide an anode for a nickel-hydrogen rechargeable battery having both high electrical capacity and long life at the same time.

According to the present invention, there is provided an age precipitation-containing rare earth metal-nickel alloy of $AB_5$ type having a composition represented by a formula (1)

$$R(Ni_{1-x}M_x)_{5+y} \qquad (1)$$

wherein R stands for a rare earth element including Y or mixtures thereof, M stands for Co, Al, Mn, Fe, Cu, Zr, Ti, Mo, W, B, or mixtures thereof, x satisfies the relation of $0.05 \leq x \leq 0.5$, and y satisfies the relation of $-0.45 \leq y \leq 0.45$, the alloy containing a precipitated phase having an average size of 0.1 to 20 μm as measured along the longitudinal axis.

According to the present invention, there is also provided a method of producing the age precipitation-containing rare earth metal-nickel alloy of $AB_5$ type as claimed in claim 1 including the steps of subjecting a raw alloy material having a composition represented by a formula (1) to a solid solution treatment at a temperature of not less than 1000° C., $$R(Ni_{1-x}M_x)_{5+y} \qquad (1)$$

wherein R stands for a rare earth element including Y or mixtures thereof, M stands for Co, Al, Mn, Fe, Cu, Zr, Ti, Mo, W, B, or mixtures thereof, x satisfies the relation of $0.05 \leq x \leq 0.5$, and y satisfies the relation of $-0.45 \leq y \leq 0.45$, and ageing the alloy material subjected to the solid solution treatment, at a temperature T (° C.) of not less than 700° C. and less than 1000° C. for a time period t (hour) which satisfies the relation represented by the formula (2)

$$(830-T)/200 \leq \log t \leq (1200-T)/200 \qquad (2),$$

thereby precipitating a precipitated phase having an average size of 0.1 to 20 μm as measured along the longitudinal axis.

According to the present invention, there is further provided an anode for a nickel-hydrogen rechargeable battery containing as an anode material the above age precipitation-containing rare earth metal-nickel alloy and an electrically conductive material.

BEST MODE FOR CARRYING OUT THE INVENTION

The present invention is described in detail below.

The age precipitation-containing alloy of the present invention is an $AB_5$ type rare earth metal-nickel alloy having a composition (referred to as "composition A" hereinbelow) represented by the formula (1)

$$R(Ni_{1-x}M_x)_{5+y} \quad (1)$$

wherein R stands for a rare earth element including Y or mixtures thereof, M stands for Co, Al, Mn, Fe, Cu, Zr, Ti, Mo, W, B, or mixtures thereof, x satisfies the relation of $0.05 \leq x \leq 0.5$, and y satisfies the relation of $-0.45 \leq y \leq 0.45$, and containing a precipitated phase having the average size of 0.1 to 20 μm, preferably 1 to 10 μm as measured along the longitudinal axis. If the average size of the precipitated phase as measured along the logitudinal axis is less than 0.1 μm, life of the nickel-hydrogen storage battery of which anode is made of the alloy is not improved. On the other hand, if the average size of the precipitated phase as measured along the longitudinal axis is greater than 20 μm, the electrical capacity of the nickel-hydrogen storage battery of which anode is made of the alloy is lowered. The precipitated phase may be measured, for example, by a scanning electron microscope and the like. The content of the precipitated phase in the age precipitation-containing alloy is not particularly limited, but is preferably not less than 0.01 volume %. The maximum content of the precipitated phase is not particularly limited as long as the above effect can be achieved, but is preferably up to 30 volume %. The content of the precipitated phase is most preferably 1 to 15 volume %.

In the formula (1) representing the composition A, if x is less than 0.05, life of the nickel-hydrogen rechargeable battery of which anode is made of the alloy becomes short, whereas if x is more than 0.5, surface activity of the alloy is lowered to cause the hydrogen storage capacity to be lowered. Further, if y is less than −0.45, life of the nickel-hydrogen rechargeable battery of which anode is made of the alloy is lowered, whereas if y is more than 0.45, the electrical capacity is decreased.

In the formula representing the composition A, R can be one or more elements selected from rare earth metal elements including Y. There is no limitation to the rare earth metal elements, but, for example, the composition having 20 to 100 atm. % of La, 0 to 60 atm. % of Ce, 0 to 15 atm. % of Pr, and 0 to 50 atm. % of Nd, and misch metal are preferred. Among these, a mixture of 25 to 60 atm. % of La, 20 to 50 atm. % of Ce, 3 to 10 atm. % of Pr, and 15 to 40 atm. % of Nd is particularly preferred.

In the formula representing the composition A, metals represented by M may be one kind or a combination of two or more kinds. The two or more kinds of metals may suitably be combined according to the properties of each metal. Specifically, Co has effects of expanding the lattice of crystals to lower the equilibrium pressure of hydrogen, and of preventing pulverization to improve the life. The mixing ratio of Co to the rare earth metal element represented by R in the formula in atomic ratio is preferably 0.1 to 1.5:1, more preferably 0.3 to 1.0:1 (the mixing ratio of other metals will be described on this basis hereinbelow).

Al has effects of expanding the lattice of crystals to lower the equilibrium pressure of hydrogen, and of increasing the hydrogen storage capacity. The mixing ratio of Al is preferably 0.1 to 1.0, more preferably 0.2 to 0.5 in atomic ratio.

Mn has effects of expanding the lattice of crystals to lower the equilibrium pressure of hydrogen, and of increasing the hydrogen storage capacity. The mixing ratio of Mn is preferably 0.01 to 1.0, more preferably 0.2 to 0.6 in atomic ratio.

Fe has an effect of activating the surface of the alloy to accelerate the hydrogen absorption-desorption rate. Ihe mixing ratio of Fe is preferably not more than 0.1, more preferably 0.01 to 0.03 in atomic ratio.

Cu has an effect of expanding the lattice of crystals to lower the equilibrium pressure of hydrogen. The mixing ratio of Cu is preferably 0.01 to 1.0, more preferably 0.05 to 0.5 in atomic ratio.

Zr has effects of improving the hysterisis property of ACT curve (hydrogen desorption pressure-composition diagram), and of improving the life of the nickel-hydrogen rechargeable battery which is made from the alloy by precipitating at the grain boundary to prevent cracking. The mixing ratio of Zr is preferably not more than 0.1, more preferably 0.01 to 0.03 in atomic ratio.

Ti has an effect of improving the hysterisis property of PCT curve. The mixing ratio of Ti is preferably not more than 0.1, more preferably 0.01 to 0.03 in atomic ratio.

Mo, W, and B each has an effect of improving the surface activity of the alloy to accelerate the hydrogen absorption-desorption rate. The mixing ratio of each of Mo, W, and B is preferably not more than 0.1, more preferably 0.01 to 0.03 in atomic ratio, respectively.

Particular examples of the composition A may preferably include:

$La_{0.25}Ce_{0.5}Pr_{0.05}Nd_{0.2}Ni_{3.2}Al_{0.2}Co_{0.8}Mn_{0.5}Fe_{0.02}$,
$La_{0.25}Ce_{0.5}Pr_{0.05}Nd_{0.2}Ni_{3.3}Al_{0.3}Co_{0.7}Mn_{0.4}Fe_{0.02}$,
$La_{0.25}Ce_{0.5}Pr_{0.05}Nd_{0.2}Ni_{3.65}Al_{0.2}Co_{0.85}Mn_{0.5}Fe_{0.02}$,
$La_{0.25}Ce_{0.5}Pr_{0.5}Nd_{0.2}Ni_{3.9}Al_{0.3}Co_{0.6}Mn_{0.4}Fe_{0.02}$,
$La_{0.5}Ce_{0.1}Pr_{0.05}Nd_{0.35}Ni_{3.3}Al_{0.3}Co_{0.7}Mn_{0.4}Fe_{0.02}$,
$La_{0.5}Ce_{0.1}Pr_{0.05}Nd_{0.35}Ni_{4.2}Al_{0.1}Co_{0.4}Mn_{0.1}Fe_{0.02}$,
$La_{1.0}Ni_{3.2}Al_{0.3}Co_{0.8}Mn_{0.4}Fe_{0.02}$,

$La_{0.25}Ce_{0.5}Pr_{0.05}Nd_{0.2}Ni_{3.4}Al_{0.3}Co_{0.75}Mn_{0.4}Ti_{0.02}$,
$La_{0.25}Ce_{0.5}Pr_{0.05}Nd_{0.2}Ni_{3.9}Al_{0.3}Co_{0.7}Mn_{0.4}Cu_{0.02}$,
$La_{0.25}Ce_{0.5}Pr_{0.05}Nd_{0.2}Ni_{3.65}Al_{0.2}Co_{0.85}Mn_{0.5}Zr_{0.02}$,
$La_{0.25}Ce_{0.5}Pr_{0.05}Nd_{0.2}Ni_{3.1}Al_{0.3}Co_{0.8}Mn_{0.4}Fe_{0.02}$,
$La_{0.25}Ce_{0.5}Pr_{0.05}Nd_{0.2}Ni_{3.65}Al_{0.2}Co_{0.75}Mn_{0.5}Fe_{0.02}$,
$La_{0.25}Ce_{0.5}Pr_{0.05}Nd_{0.2}Ni_{3.9}Al_{0.3}Co_{0.7}Mn_{0.4}Fe_{0.02}$,
$La_{0.25}Ce_{0.5}Pr_{0.05}Nd_{0.2}Ni_{3.3}Al_{0.3}Co_{0.85}Mn_{0.4}Fe_{0.02}$, and
$La_{0.25}Ce_{0.5}Pr_{0.05}Nd_{0.2}Ni_{2.8}Al_{0.3}Co_{1.1}Mn_{0.6}Fe_{0.02}$.

The age precipitation-containing alloy of the present invention may be produced, for example, by combining a particular solid solution treatment and an ageing.

In the present method of producing the age precipitation-containing alloy of the present invention, raw alloy material having the composition A represented by the above-mentioned formula (1) is first subjected to a solid solution treatment at a temperature of not less than 1000° C. The raw alloy material may be in any form, such as alloy ingots, alloy flakes, alloy ribbons, alloy powders, as long as the raw alloy material has the composition A. Also, the method for preparing the raw alloy material is not particularly limited, and the raw alloy material prepared by a conventional method such as mold casting method, melt roll method, melt centrifugal method, heat reduction diffusion method, and gas atomizing method, may be used. The raw alloy material obtained by rapidly quenching and solidifying at a cooling rate of preferably not less than 1000° C./sec, more preferably 5000 to 100000° C./sec. may be used.

The solid solution treatment is a treatment wherein the alloy is heated to a temperature at or above the solubility line of the second phase to dissolve the second phase into the first phase, and then is cooled. This treatment may be effected, for example, by heating the alloy in an inert gas atmosphere such as argon gas under the above conditions to give a homogeneous solid solution (i.e. the alloy wherein the atoms of particular elements have intruded into a lattice of crystals of another metal element with the crystal form of the latter metal element being maintained), and then cooling the solid solution. It has not been recognized that a conventional $AB_5$ type rare earth metal-nickel alloy has the solid solution range obtained by this solid solution treatment as described in the above-mentioned "T. B. Massalski et al.: Binary Alloy Phase Diagrams, Vol. 2, 1468 ASM (1986)".

Figure 1A:
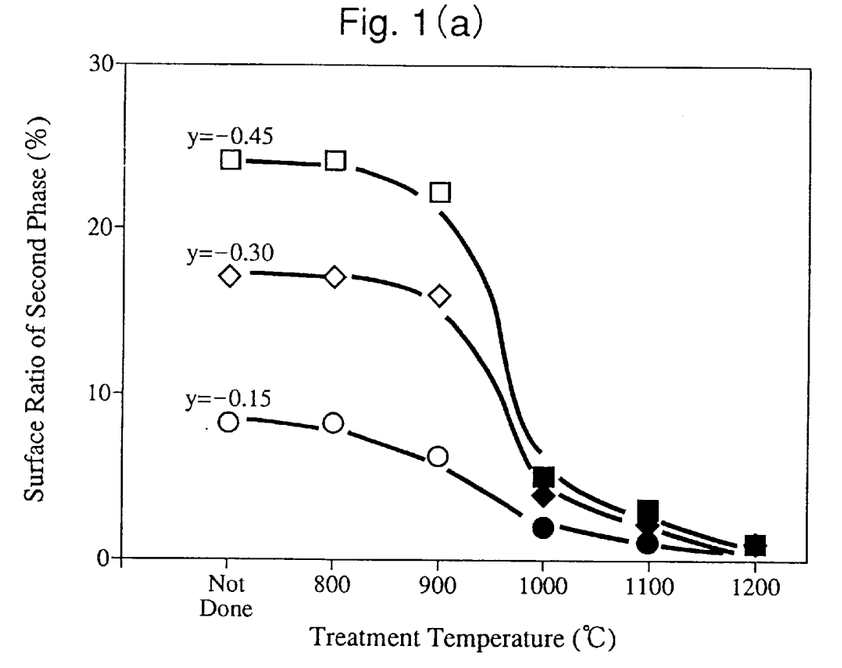
FIGS. 1(a) and 1(b) are graphs showing the results of the experiments conducted for determining the conditions of the solid solution treatment of the raw alloy material in producing the alloy of the present invention.
Figure 1B:
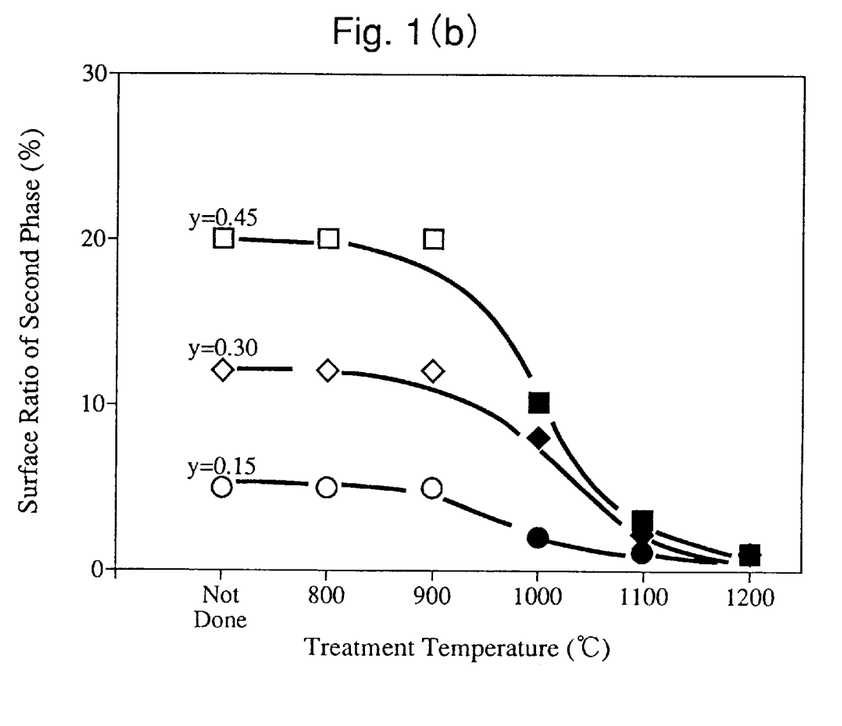

In the method of the present invention, the temperature of the solid solution treatment is determined based on the experimental data of various compositions in the formula (1). Examples are shown in FIGS. 1(a) and 1(b). FIG. 1(a) illustrates an example wherein misch metal (Mm) is used as the component R and Al, Co, and Mn are used as the component M in the formula (1). That is, sample alloys prepared by varying the value of y in the composition represented by the formula $Mm(Ni_{0.7}Al_{0.06}Co_{0.15}Mn_{0.09})_{5+y}$ within the range of $-0.45 \leq y \leq 0$, are annealed for 10 hours in an argon gas at various temperatures, respectively, and cooled by gas jet. Structures of the obtained sample alloys are observed by an electron microscope to show the rate of existence of the residual second phase in surface ratio. FIG. 1(b) shows the results of the similar experiments wherein the value of y is varied within the range of $0 \leq y \leq 0.45$ in the above composition. The second phases observed in each of the alloys of the experiments in FIG. 1(a) and 1(b) were analyzed to find precipitations rich in rare earth metals in the former experiments, and precipitation rich in Ni, Co, and Mn in the latter experiments. As seen from these figures, the rate of existence of the second phase drops at the temperature of 1000° C. or higher, to indicate that the second phase has been dissolved. The maximum temperature for the solid solution treatment is not particularly limited, but preferably up to 1250° C., more preferably up to 1200° C. The duration of the solid solution treatment is preferably 1 to 100 hours, more preferably 5 to 50 hours. The cooling in the solid solution treatment may be effected by a conventional quenching method such as introduction into water or oil, gas cooling, or mist cooling, after the alloy is made into a solid solution at 1000° C. or higher. This cooling may be effected at a cooling rate of about 10 to 1000° C./sec.

In the method of the present invention, the alloy material subjected to the above solid solution treatment is aged at a temperature T (° C.) of not less than 700° C. and less than 1000° C. for a time period t (hour) which satisfies the relation represented by the formula (2)

$$(830-T)/200 \leq \log t \leq (1200-T)/200 \qquad (2).$$

Ageing is a treatment to vary the properties of metal materials with the lapse of time to precipitate fine secondary phases from a solid solution which is in the state of non-equilibrium phase such as supersaturated solid solution.

Figure 2A:
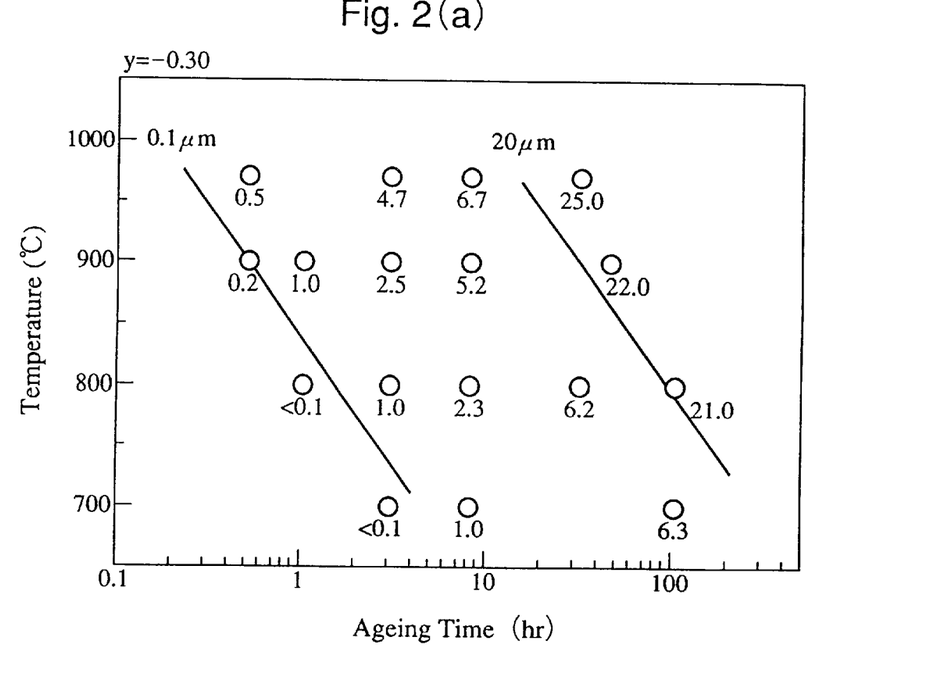
FIGS. 2(a) and 2(b) are graphs showing the results of the experiments conducted for determining the conditions of the ageing performed after the solid solution treatment of the raw alloy material in producing the alloy of the present invention.
Figure 2B:
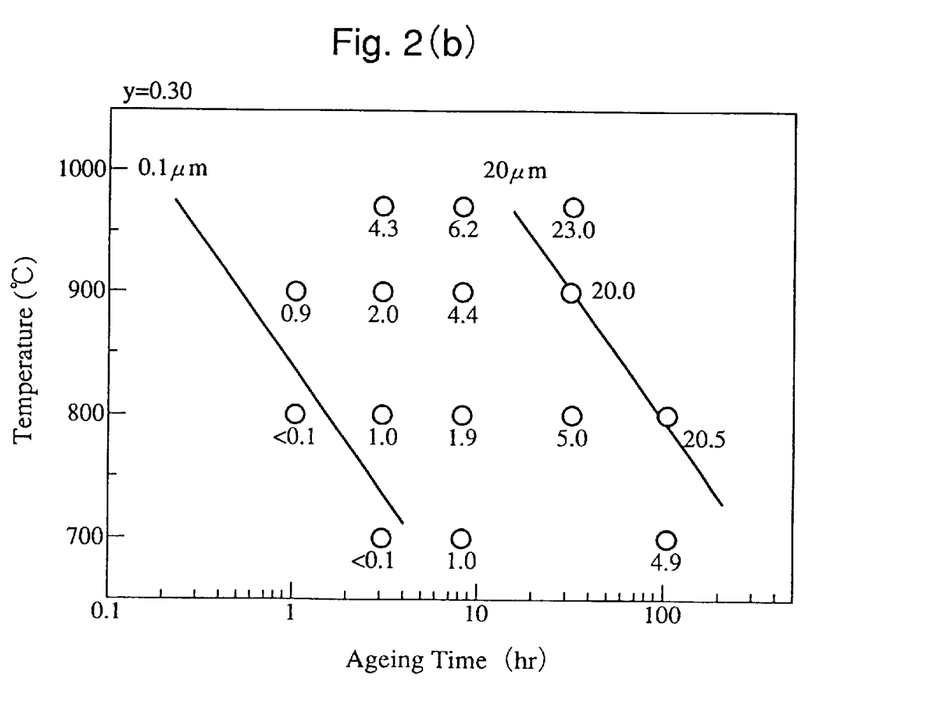

The conditions of the ageing were determined based on the experimental data of various compositions in the formula (1). Examples are shown in FIGS. 2(a) and 2(b). FIGS. 2(a) and 2(b) were made by subjecting the sample alloys used in the experiments of FIGS. 1(a) and 1(b) (y=−0.30; FIG. 2(a), y=0.30; FIG. 2(b)) to a solid solution treatment at 1100° C. for 10 hours, ageing the alloys by heating in an argon gas with the temperature (T) and the time period (t) being varied, cooling the resulting alloys, observing the structure in the cross-sectional plane of the alloys to calculate the average size ($\mu$m) of the precipitations as measured along the longitudinal axis, and plotting the calculated values in the graph. From these figures, it is understood that the precipitated phases having the average size of 0.1 to 20 $\mu$m as measured along the longitudinal axis are precipitated when the treatment time t (hour) satisfies the above formula (2) at each temperature T (° C.). When the temperature is less than 700° C., satisfactory precipitated phases are not formed, or extremely prolonged treatment time is required, thus being not for practical use. On the other hand, when the temperature is at 1000° C. or higher, substantially uniform, fine precipitated phases are not formed. The ageing is preferably carried out at a temperature within the range of 800 to 950° C. for the time period which satisfies the above formula (2). The preferable atmosphere for the ageing is inert gas atmosphere such as argon gas.

According to the method of the present invention, an alloy containing the above-mentioned precipitated phases having the average size of 0.1 to 20 $\mu$m as measured along the longitudinal axis can be obtained through the ageing. The precipitated phases have the composition rich in rare earth metals such as $A_2 B_7$ type under the compositional condition wherein y in the formula (1) is negative (for example, the composition with y=−0.30 as used in the above experiment). By controlling the size and the amount of such precipitated phases, initial activity is improved as well as other properties of the battery such as high electrical capacity and long life. This improvement is thought to be caused by micro cracks introduced into the alloy starting from the precipitated phases in the beginning of its use. On the other hand, under the compositional condition wherein y in the formula (1) is positive (for example, the composition with y=0.30 as used in the above experiment), the precipitated phases have the composition rich in transition metals such as Ni and Co in the formula (1). By controlling the size and the amount of such precipitated phases, high electrical capacity, long life, and initial activity are improved. These improvements are thought to be caused by the finely dispersed precipitations containing Ni and Co as main ingredients, which contribute to the improvement of catalytic activity on the surface of the alloy.

The age precipitation-containing rare earth metal-nickel alloy of the present invention may also be prepared by other method than the method including the above solid solution treatment, that is, by controlling the composition and preparation method of the raw alloy material and the conditions of the ageing, without effecting the solid solution treatment.

For example, the age precipitatlion-containing alloy of the present invention may be obtained by rapidly quenching and solidifying a raw alloy melt having the composition A represented by the above formula (1) at a cooling rate of not less than 1000° C./sec. and ageing the solidified alloy at a temperature of not less than 700° C. and less than 1000° C., wherein when the composition of the solidified alloy is represented by the formula (1) with y being $-0.45 \leq y \leq -0.3$, or $0.2 \leq y \leq 0.45$, the ageing is effected for the time period of more than 1 hour and not more than 25 hours, whereas when the composition of the solidified alloy is represented by the formula (1) with y being $-0.3 \leq y \leq 0.2$, the ageing is effected for the time period of more than 5 hours and not more than 50 hours (referred to as "the other production method" hereinbelow).

In the above method without the solid solution treatment, it is thought that the duration of the ageing should be controlled as above depending on the composition since the completeness of the forcible dissolution of the alloy elements are inferior in this case, as compared to the case wherein the solid solution treatment is effected. In the composition, y in the formula (1) is a parameter indicating the difference in A component (rare earth metal elements) or B component (Ni and M elements) from the composition of the $AB_5$ type matrix. The larger the absolute value of y is, the larger the ratio of A or B component forcibly dissolved in the matrix is. Accordingly, when such alloy is aged by heating, the larger the absolute value of y in the composition (with large degree of supersaturation) is, the greater the rate and size of precipitation of A or B component are. On the contrary, when the absolute value of y in the composition is smaller (with small degree of supersaturation), ageing for a longer period of time is required for obtaining desired precipitated phases. Thus, it is thought to be necessary to age the alloy material for the above time period depending on the composition.

In the other production method, the raw alloy melt may be prepared using a conventional vacuum melting furnace and the like. As the rapid quenching and solidification, rapid-quenching casting method using a single roll or double rolls, centrifugal atomizing method, or gas-atomizing method may be applied as long as alloy flakes, alloy ribbons, alloy powders and the like can be prepared at a cooling rate of not less than 1000° C./sec., preferably 5000 to 100000° C./sec. from the alloy melt through the method. If the cooling rate is less than 1000° C./sec., the force for dissolving the alloy elements is not satisfactory, and thus the desired precipitated phases cannot be obtained without the solid solution treatment.

In the other production method, the ageing of the rapidly quenched and solidified alloy material for a predetermined time period at a temperature of not less than 700° C. and less than 1000° C., preferably 800 to 950° C., may be effected by the same procedure as in the present method with the solid solution treatment, except for controlling the ageing time according to the composition as described above.

An anode for a nickel-hydrogen rechargeable battery of the present invention contains as anode material the above-mentioned age precipitation-containing alloy and an electrically conductive material.

The age precipitation-containing alloy is used preferably in a pulverized form with a particle size of preferably 20 to 100 $\mu$m, more preferably with a uniform particle size of 40 to 50 $\mu$m. The pulverization may be effected by coarsely crushing the obtained age precipitation-containing alloy by a stamp mill or the like, and then mechanically pulverizing through a dry or wet process using a ball mill, a disk mill, or the like apparatus; by a hydrogenation-dehydrogenation pulverizing method; or by a combined method of these. The content of the age precipitation-containing alloy is preferably 70 to 95% by weight, more preferably 80 to 90% by weight of the total amount of the anode material. If the content of the age precipitation-containing alloy is less than 70% by weight, the hydrogen storage capacity of the obtained anode is lowered, so that it becomes difficult to achieve the high capacity, thus being not preferred. On the other hand, if the content is more than 95% by weight, the electrical conductivity and durability are lowered, thus being not preferred.

The electrically conductive material may include copper, nickel, cobalt, carbon, or the like. Usage of these materials may depend on the preparation method of the anode, but these materials may usually be used in the form of powders having the particle size of 1 to 10 $\mu$m. When a conductive metal such as copper, nickel, and cobalt is used, the material may be metal-plated over the age precipitation-containing alloy. The content of the electrically conductive material is preferably 5 to 30% by weight, more preferably 10 to 20% by weight of the total amount of the anode material.

In the anode for a nickel-hydrogen rechargeable battery of the present invention, a binder may be contained in addition to the above-mentioned requisite materials. The binder may preferably include ethylene tetrafluoride-propylene hexafluoride copolymer, polytetrafluoroethylene, carboxymethyl cellulose, or the like. The desired content of the binder is less than 10% by weight of the total amount of the anode material.

The anode for a nickel-hydrogen rechargeable battery of the present invention may be prepared, for example, by binding the pulverized age precipitation-containing alloy on a collector body of the conductive material such as nickel mesh, nickel or copper expanded metal, nickel or copper punched metal, foamed nickel, and woolen nickel. The binding may be effected by rolling press method, molding press method, or the like, into the form of a sheet or a pellet. The anode obtained may be used in the same manner as an ordinary electrode for a nickel-hydrogen rechargeable battery to form a rechargeable battery.

The age precipitation-containing alloy of the present invention contains a precipitated phase having an average size of 0.1 to 20 $\mu$m as measured along the longitudinal axis, the alloy can exhibit both long life and high electrical capacity at the same time when used as an anode material for a nickel-hydrogen rechargeable battery.

According to the method of the present invention, the above-mentioned age precipitation-containing alloy can be obtained easily by a simple method of subjecting a raw alloy material having the particular composition to a solid solution treatment and ageing.

Further, the anode for a nickel-hydrogen rechargeable battery of the present invention exhibits both long life and high electrical capacity at the same time, and thus are expected to be demanded in place of conventional anodes.

EXAMPLE

The present invention will now be explained in more detail with reference to the following examples and comparative examples, but the present invention is not intended to be limited thereto.

Examples 1 to 7

As starting materials, misch metal (referred to as Mm hereinbelow) (composition of the rare earth metals: 25% by weight of La, 50% by weight of Ce, 5% by weight of Pr, and 20% by weight of Nd) manufactured by Santoku Metal Industry Co., Ltd., Ni of 99.9% purity, Al of 99.9% purity, Co, Mn, Fe, Ti, Cu, and Zr containing trace Hf were mixed to have the compositions as shown in Table 1, melted by high frequency melting method in an argon gas atmosphere using an alumina crucible, and casted in a water-cooled copper mold to obtain alloy ingots having the compositions as shown in Table 1. Subsequently, the obtained alloy ingots were charged in a heat treatment furnace heated by electrical resistance in argon gas atmosphere, heated at 1100° C. for 10 hours, and rapidly cooled by introducing into water. The resulting ingots were taken out of the water, dried, and charged in a heat treatment furnace in argon gas atmosphere again, and aged by heating at 900° C. for 8 hours.

Figure 3:
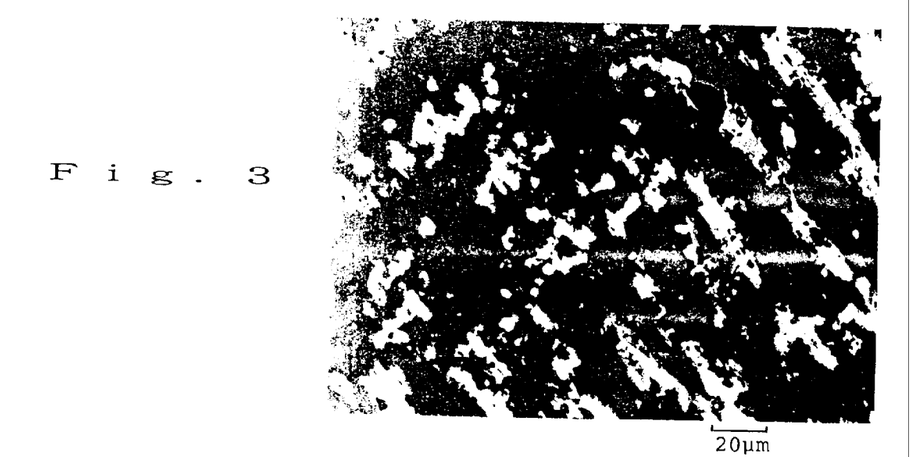
FIG. 3 is a photograph of the raw alloy material prepared in Example 1 taken by a scanning electron microscope after the mold casting.
Figure 4:
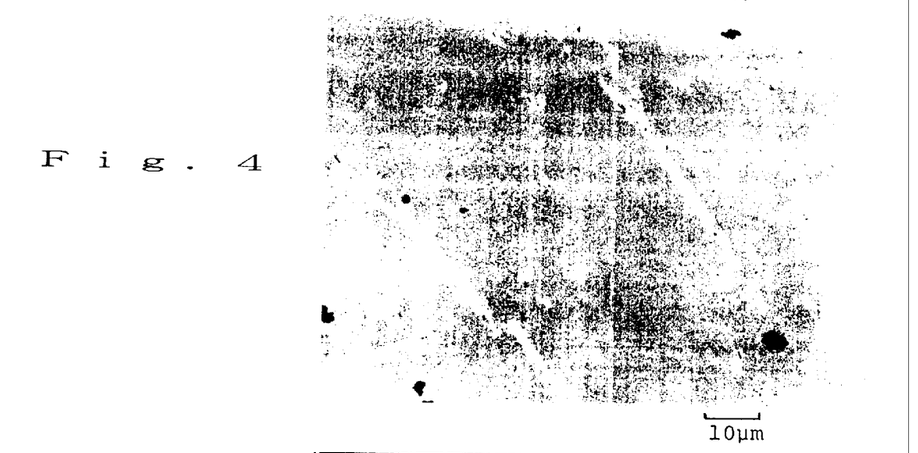
FIG. 4 is a photograph of the alloy prepared in Example 1 taken by a scanning electron microscope after the solution heat treatment.
Figure 5:
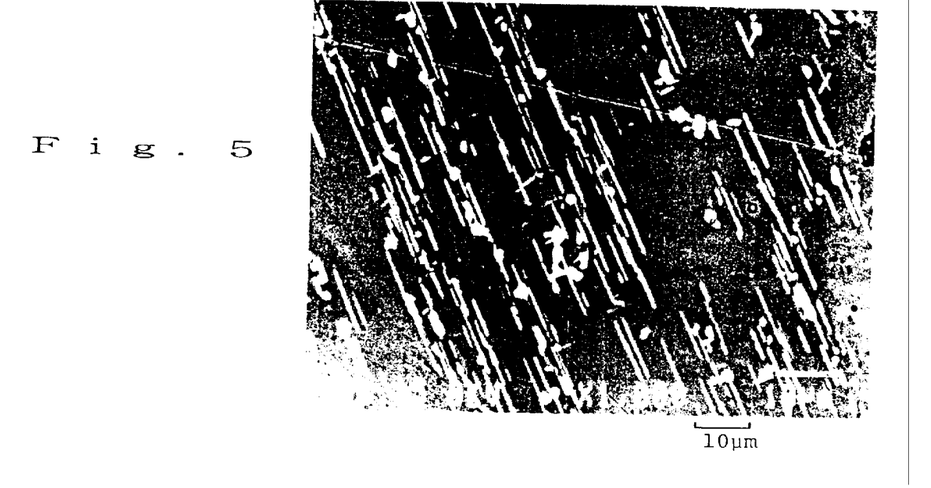
FIG. 5 is a photograph of the age precipitation-containing alloy prepared in Example 1 taken by a scanning electron microscope.
Figure 6:
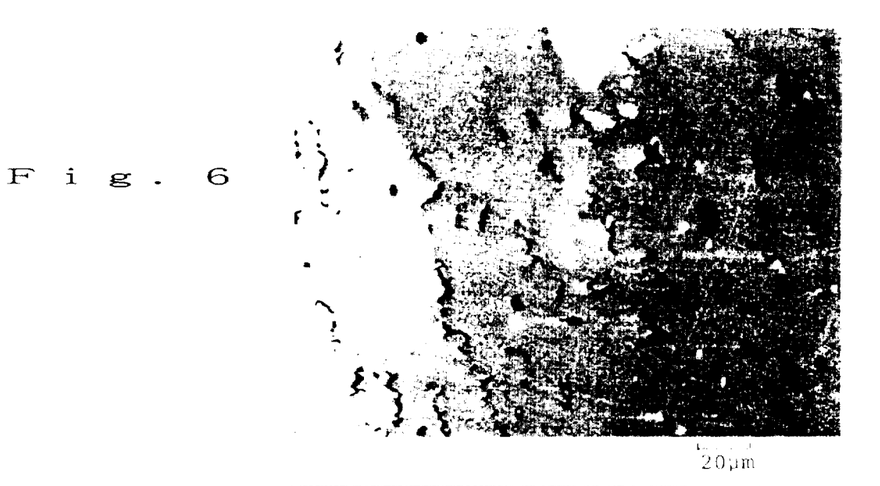
FIG. 6 is a photograph of the raw alloy material prepared in Example 3 taken by a scanning electron microscope after the mold casting.
Figure 7:
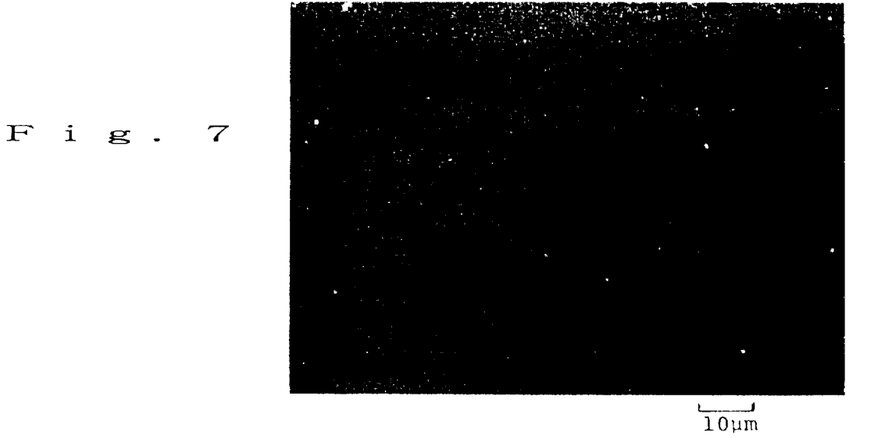
FIG. 7 is a photograph of the alloy prepared in Example 3 taken by a scanning electron microscope after the solid solution treatment.
Figure 8:
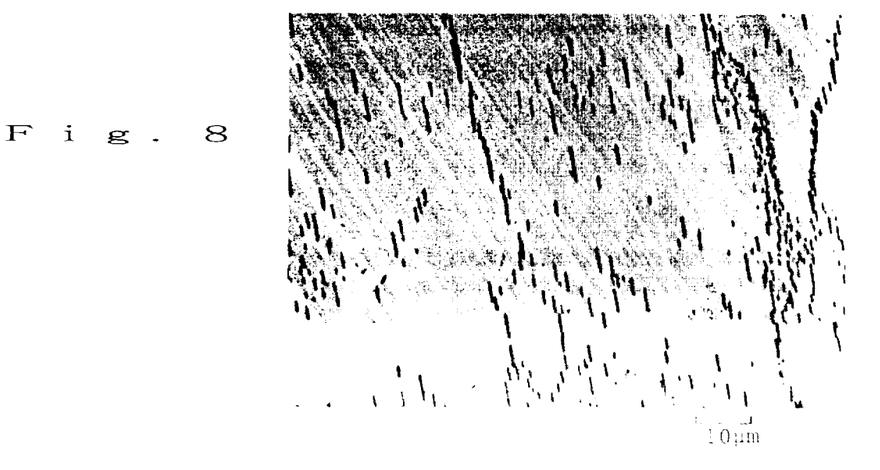
FIG. 8 is a photograph of the age precipitation-containing alloy prepared in Example 3 taken by a scanning electron microscope.

The precipitated phases of the aged alloys were observed by a scanning electron microscope to confirm the presence of the precipitated phases, and the average grain size of the precipitated phases were calculated. The results are shown in Table 2. Also, photographs of the alloy of Example 1 after the casting, after the solid solution treatment, and after the ageing, each taken by the scanning electron microscope are shown in FIGS. 3 to 5. Similar photographs of the alloy of Example 3 are also shown in FIGS. 6 to 8. It is understood from FIGS. 3 to 8 that the second phase observed in the alloy structure after casting becomes solid solution after the solid solution treatment, and that precipitated phases are precipitated after the ageing.

The aged alloys obtained above were coarsely crushed in a stamp mill, and further pulverized in a planetary ball mill in a hexan solvent into powders having an average particle size of 80 μm. 10 g of the obtained powders were mixed with 1 g of copper powders as an electrically conductive material and 0.3 g of powders of ethylene tetrafluoride-propylene hexafluoride copolymer to prepare pellet electrodes having a diameter of 20 mm. Cells were produced by the above electrodes dipped in a 6N KOH solution and reference electrodes of mercury oxide, and electrode characteristics were measured using a potentiogalvanostat manufactured by HOKUTO DENKO CORPORATION. The results are shown in Table 2.

Examples 8 to 10

Alloys were prepared in the same way as in Examples 1 to 7 to have the compositions as shown in Table 1, except that Mm was replaced by metals of La, Ce, Pr, and Nd, each of 99% purity and manufactured by Santoku Metal Industry, Co., Ltd. Measurements were made as to the obtained alloys and cells made from the alloy in a pulverized form in the same way as in Examples 1 to 7. The results are shown in Table 2.

Example 11

A raw material having the same composition as that of Example 1 was melted by a high frequency melting method to give an alloy melt. The alloy melt was rapidly quenched and solidified by a single-roll casting method to obtain alloy ribbons having a thickness of 0.3 to 0.4 mm. In the rapid quenching and solidification, the cooling rate was 10000° C./sec. The resulting alloy ribbons were charged in a heat treatment furnace heated by electrical resistance in an argon atmosphere, heated at 1100° C. for 5 hours, and rapidly cooled by introducing into water. Then the cooled alloy was dried, charged in the heat treatment furnace in argon atmosphere again, and aged by heating at 850° C. for 10 hours. Measurements were made as to the obtained alloy and a cell made from the alloy in a pulverized form in the same way as in Examples 1 to 7. The results are shown in Table 2.

Examples 12 to 15

Figure 9:
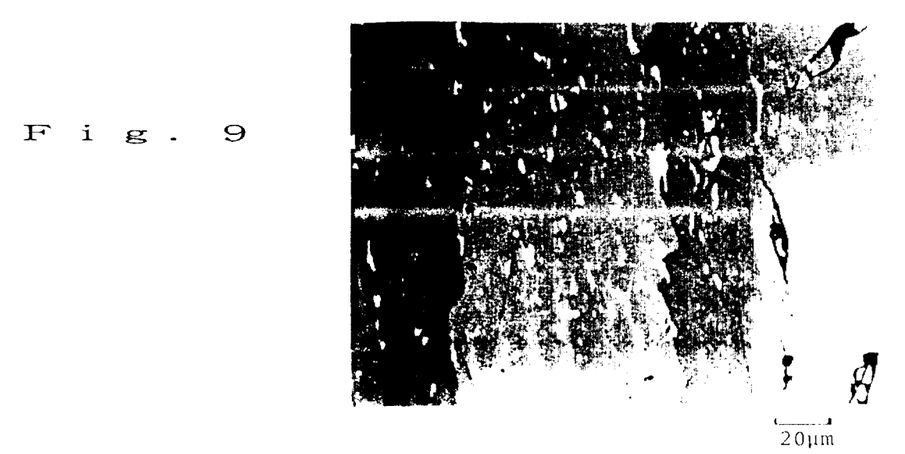
FIG. 9 is a photograph of the alloy prepare in Example 12 taken by a scanning electron microscope after the rapid quenching and solidification by a single-roll method.
Figure 10:
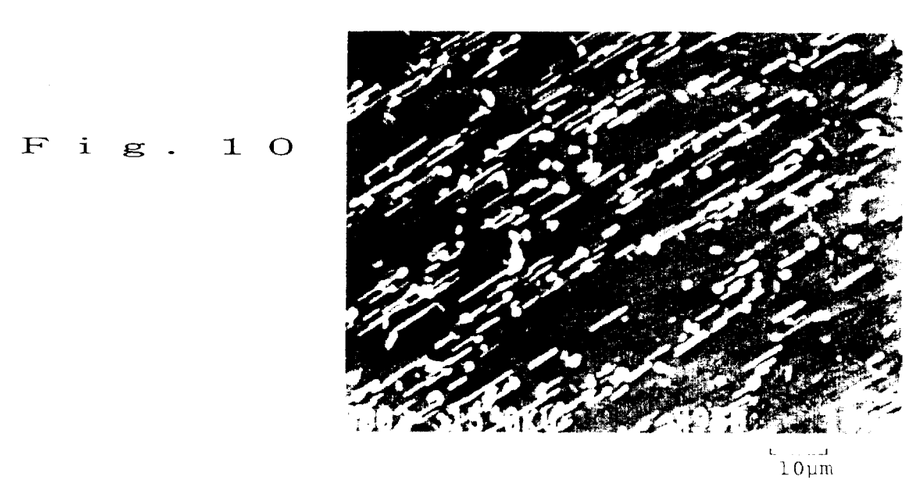
FIG. 10 is a photograph of the age precipitation-containing alloy prepared in Example 12 taken by a scanning electron microscope.

Raw materials each having the composition shown in Table 1 were melted by a high frequency melting method and made into alloys by a single-roll casting method as in Example 11. The obtained alloys were immediately aged in argon atmosphere under the conditions as shown in Table 2 without being subjected to a solid solution treatment, thereby obtaining alloys. Measurements were made as to the obtained alloys and cells made from the alloys in a pulverized form in the same way as in Examples 1 to 7. The results are shown in Table 2. Further, photographs of the alloy in Example 12 after the rapid quenching and solidification and after the ageing, each taken by a scanning electron microscope are shown in FIGS. 9 and 10. It is understood from these figures that large precipitation of the second phase is not recognized in the crystal grains, but only small precipitation of the second phase is recognized at the crystal grain boundaries after the rapid quenching and solidification. That is, the alloy was in the non-equilibrium state wherein the second phase was forcibly dissolved. After the ageing, fine precipitated phases were precipitated.

Examples 16 and 17

Raw materials each having the composition shown in Table 1 were melted by a high frequency melting method to give alloy melts. Each alloy melt was rapidly quenched and solidified by a gas atomizing method using an argon gas to obtain alloy particles having an average particle size of 90 μm. In the rapid quenching and solidification, the cooling rate was 5000° C./sec. The structures of the alloy particles were observed to find that large precipitation of the second phase was not recognized in either alloy particles, and the alloys were in the non-equilibrium state wherein the second phase was forcibly dissolved. Both alloy particles were aged under the conditions as shown in Table 2. Measurements were made as to the obtained alloys and cells made from the alloys in a pulverized form in the same way as in Examples 1 to 7. The results are shown in Table 2.

The above examples wherein the precipitated phases were formed according to the present invention exhibit high initial discharge capacity, and more than 95% of the capacity is maintained even after 200 cycles, which indicates that the cells exhibit excellent life. Further, in Examples 11 to 17 wherein the alloys were produced by rapid quenching and solidification in stead of the solid solution treatment, it is understood that high initial discharge capacity and excellent cell life can be achieved by selecting the ageing time depending on the value of y in the compositional formula (1), even when the solid solution treatment is omitted.

Comparative Example 1

An ingot was produced by the high frequency melting method in the same way as in Example 1. Measurements were made of the obtained ingot without subjecting the ingot to the solid solution treatment and ageing, and of a cell made from the ingot in a pulverized form in the same way as in Examples 1 to 7. The results are shown in Table 2.

Comparative Example 2

An ingot produced by the high frequency melting method in the same way as in Example 1 was subjected to the same treatment as in Examples 1 to 7 except that the ingot was subjected to only the solid solution treatment without ageing to obtain an alloy. Measurements were made of the obtained alloy and a cell made from the alloy in a pulverized form in the same way as in Examples 1 to 7. The results are shown in Table 2.

Comparative Example 3

An ingot produced by the high frequency melting method in the same way as in Example 1 was subjected to the same treatment as in Examples 1 to 7 except that the ingot was subjected to only the ageing without the solid solution treatment to obtain an alloy. Measurements were made of the obtained alloy and a cell made from the alloy in a pulverized form in the same way as in Examples 1 to 7. The results are shown in Table 2.

Comparative Example 4

A raw material having the same composition as that in Example 12 was melted by a high frequency melting method, and made into an alloy in the same way as in Example 12 except that, when the alloy melt was solidified by a single-roll casting method, the cooling rate was set to be about 500° C./sec. under the conditions of decreased cooling water for the roll and the increased injection of the alloy melt. Measurements were made of the obtained alloy and a cell made from the alloy in a pulverized form in the same way as in Examples 1 to 7. The results are shown in Table 2.

Comparative Example 5

The alloy ribbons produced by the single-roll method in Example 12 were heat treated at 850° C. for 3 hours in an argon atmosphere to obtain an alloy. Measurements were made of the obtained alloy and a cell made from the the alloy in a pulverized form in the same way as in Examples 1 to 7. The results are shown in Table 2.

Comparative Example 6

A raw material having the same composition as that in Example 17 was melted by the high frequency melting method, and rapidly quenched and solidified by the single-roll casting method as in Example 11 to obtain alloy ribbons. The obtained alloy ribbons were heat treated at 800° C. for 5 hours in an argon atmosphere, thereby obtaining an alloy. Measurements were made of the obtained alloy and a cell made from the alloy in a pulverized form in the same way as in Examples 1 to 7. The results are shown in Table 2.

Comparative Example 7

An alloy was produced in the same way as in Example 11 except that the solid solution treatment was carried out under the conditions as shown in Table 2 and the ageing was not effected. Measurements were made of the obtained alloy and a cell made from the alloy in a pulverized from in the same way as in Examples 1 to 7. The results are shown in Table 2.

Comparative Example 8

A raw material having the same composition as that in Example 11 was melted by the high frequency melting method, and rapidly quenched and solidified by the single-roll casting method as in Example 11 to obtain alloy ribbons. Measurements were made of the obtained alloy ribbons without subjecting the ribbons to the solid solution treatment and ageing, and of a cell made from the alloy ribbons in a pulverized form in the same way as in Examples 1 to 7. The results are shown in Table 2.

The above comparative examples wherein the precipitated phases of the present invention were not formed exhibit lower initial discharge capacity and lower rate of maintenance of the capacity after 200 cycles, as compared to the examples of the same composition.

TABLE 1

| | Alloy Composition (Atomic Ratio) | | | | | | | | | | | | in Formula (1) | |
|---|---|---|---|---|---|---|---|---|---|---|---|---|---|---|
| | La | Ce | Pr | Nd | Ni | Al | Co | Mn | Fe | Ti | Cu | Zr | x | y |
| Ex. 1, Comp. Ex. 1~3 | 0.25 | 0.50 | 0.05 | 0.20 | 3.30 | 0.30 | 0.70 | 0.40 | 0.02 | — | — | — | 0.30 | −0.28 |
| Ex. 2 | 0.25 | 0.50 | 0.05 | 0.20 | 3.40 | 0.30 | 0.75 | 0.40 | — | 0.02 | — | — | 0.30 | −0.13 |
| Ex. 3 | 0.25 | 0.50 | 0.05 | 0.20 | 3.90 | 0.30 | 0.70 | 0.40 | — | — | 0.02 | — | 0.27 | +0.32 |
| Ex. 4 | 0.25 | 0.50 | 0.05 | 0.20 | 3.65 | 0.20 | 0.85 | 0.50 | — | — | — | 0.02 | 0.30 | +0.22 |
| Ex. 5 | 0.25 | 0.50 | 0.05 | 0.20 | 3.20 | 0.20 | 0.80 | 0.50 | 0.02 | — | — | — | 0.32 | −0.28 |
| Ex. 6 | 0.25 | 0.50 | 0.05 | 0.20 | 3.90 | 0.30 | 0.60 | 0.40 | 0.02 | — | — | — | 0.34 | +0.22 |
| Ex. 7 | 0.25 | 0.50 | 0.05 | 0.20 | 2.80 | 0.30 | 1.00 | 0.60 | 0.02 | — | — | — | 0.42 | −0.18 |
| Ex. 8 | 1.00 | — | — | — | 3.20 | 0.30 | 0.80 | 0.40 | 0.02 | — | — | — | 0.32 | −0.28 |
| Ex. 9 | 0.50 | 0.10 | 0.05 | 0.35 | 3.30 | 0.30 | 0.70 | 0.40 | 0.02 | — | — | — | 0.30 | −0.28 |
| Ex. 10 | 0.50 | 0.10 | 0.05 | 0.35 | 4.20 | 0.10 | 0.40 | 0.10 | 0.02 | — | — | — | 0.13 | −0.18 |
| Ex. 11, Comp. Ex. 4,5,7,8 | 0.25 | 0.50 | 0.05 | 0.20 | 3.30 | 0.30 | 0.70 | 0.40 | 0.02 | — | — | — | 0.30 | −0.28 |
| Ex. 12 | 0.25 | 0.50 | 0.05 | 0.20 | 3.30 | 0.30 | 0.70 | 0.40 | 0.02 | — | — | — | 0.30 | −0.28 |
| Ex. 13 | 0.25 | 0.50 | 0.05 | 0.20 | 3.10 | 0.30 | 0.80 | 0.40 | 0.02 | — | — | — | 0.33 | −0.38 |
| Ex. 14 | 0.25 | 0.50 | 0.05 | 0.20 | 3.65 | 0.20 | 0.75 | 0.50 | 0.02 | — | — | — | 0.29 | +0.12 |
| Ex. 15 | 0.25 | 0.50 | 0.05 | 0.20 | 3.90 | 0.30 | 0.70 | 0.40 | 0.02 | — | — | — | 0.27 | +0.32 |
| Ex. 16 | 0.25 | 0.50 | 0.05 | 0.20 | 3.30 | 0.30 | 0.70 | 0.40 | 0.02 | — | — | — | 0.30 | −0.28 |
| Ex. 17, Comp. Ex. 6 | 0.25 | 0.50 | 0.05 | 0.20 | 3.30 | 0.30 | 0.85 | 0.40 | 0.02 | — | — | — | 0.32 | −0.13 |

TABLE 2

| Ex. | Comp. Ex. | Casting Method | Cooling Rate (°C./sec) | Conditions of Solid Solution Treatment Temp. (°C.) | Time (hr) | Conditions of Ageing Temp. (°C.) | Time (hr) | Average Size of Precipitated Phase As Measured Along Longitudinal Axis (μm) | Discharge Capacity 30th Cycle | 200th Cycle | Ratio of Maintained Capacity from 30th Cycl. to 200th Cycl. |
|---|---|---|---|---|---|---|---|---|---|---|---|
| 1 |   | Mold | <10 | 1100 | 10 | 900 | 8 | 5.2 | 305 | 295 | 95.7% |
| 2 |   | Casting |   |   |   |   |   | 3.9 | 300 | 292 | 97.3% |
| 3 |   |   |   |   |   |   |   | 5.0 | 260 | 250 | 95.1% |
| 4 |   |   |   |   |   |   |   | 4.4 | 275 | 268 | 97.4% |
| 5 |   |   |   |   |   |   |   | 5.2 | 305 | 300 | 98.3% |
| 6 |   |   |   |   |   |   |   | 4.4 | 275 | 260 | 94.5% |
| 7 |   |   |   |   |   |   |   | 4.2 | 300 | 297 | 99.0% |
| 8 |   |   |   |   |   |   |   | 4.2 | 315 | 300 | 95.2% |
| 9 |   |   |   |   |   |   |   | 5.0 | 310 | 298 | 96.1% |
| 10 |   |   |   |   |   |   |   | 4.0 | 300 | 287 | 95.7% |
|   | 1 | Mold | <10 | Not Done |   | Not Done |   | None | 260 | 200 | 76.9% |
|   | 2 | Casting |   | 1100 | 10 | Not done |   | none | 250 | 190 | 76.0% |
|   | 3 |   |   | Not Done |   | 900 | 8 | None | 280 | 245 | 87.5% |
| 11 |   | Single- | 10000 | 1100 | 5 | 850 | 10 | 4.8 | 306 | 296 | 96.7% |
| 12 |   | Roll |   | Not Done |   | 900 | 15 | 5.9 | 307 | 299 | 97.4% |
| 13 |   |   |   | Not Done |   | 900 | 4 | 2.1 | 308 | 300 | 97.4% |
| 14 |   |   |   | Not Done |   | 850 | 24 | 4.1 | 290 | 283 | 97.5% |
| 15 |   |   |   | Not Done |   | 900 | 10 | 3.5 | 280 | 270 | 96.4% |
| 16 |   | Gas | 5000 | Not Done |   | 900 | 8 | 4.4 | 300 | 292 | 97.2% |
| 17 |   | Atomizing | 5000 | Not Done |   | 850 | 24 | 4.1 | 295 | 287 | 97.3% |
|   | 4 | Single- | 500 | Not Done |   | 900 | 8 | None | 280 | 250 | 89.2% |
|   | 5 | Roll | 10000 | Not Done |   | 850 | 3 | <0.1 | 295 | 260 | 88.1% |
|   | 6 |   | 10000 | Not Done |   | 800 | 5 | <0.1 | 290 | 260 | 89.7% |
|   | 7 |   | 10000 | 1100 | 10 | Not Done |   | None | 285 | 250 | 87.7% |
|   | 8 |   | 10000 | Not Done |   | Not Done |   | None | 295 | 250 | 84.7% |

We claim:

1. An age precipitation-containing rare earth metal-nickel alloy of $AB_5$ structure having a composition represented by a formula (1)

$$R(Ni_{1-x}M_x)_{5+y} \quad (1)$$

wherein R stands for a rare earth element including Y or mixtures thereof, M stands for Co, Al, Mn, Fe, Cu, Zr, Ti, Mo, W, B, or mixtures thereof, x satisfies the relation of $0.05 \leq x \leq 0.5$, and y satisfies the relation of $-0.45 \leq y \leq 0.45$, said alloy containing an acicular precipitated phase having an average size of 0.1 to 20 μm as measured along a longitudinal axis.

2. The age precipitation-containing rare earth metal-nickel alloy defined in claim 1 wherein said R in the formula (1) is selected from the group consisting of La, Ce, Pr, Nd, and mixtures thereof.

3. The age precipitation-containing rare earth metal-nickel alloy defined in claim 1 wherein said R in the formula (1) has a composition of 25 to 60 atm. % of La, 20 to 50 atm. % of Ce, 3 to 10 atm. % of Pr, and 15 to 40 atm. % of Nd.

4. The age precipitation-containing rare earth metal-nickel alloy as in claim 1 wherein said acicular age precipitated phase has an average size of 1 to 10 μm as measured along a longitudinal axis.

5. An anode for a nickel-hydrogen rechargeable battery containing as an anode material the rare earth metal-nickel alloy defined in claim 1 and an electrically conductive material.

6. The anode for a nickel-hydrogen rechargeable battery as defined in claim 5 wherein said anode material comprises 70 to 95% by weight of said rare earth metal-nickel alloy, and 5 to 30% by weight of said electrically conductive material based on a total weight of the anode material.

7. The anode for a nickel-hydrogen rechargeable battery as defined in claim 5 wherein said anode material further comprises a binder.

* * * * *

UNITED STATES PATENT AND TRADEMARK OFFICE
CERTIFICATE OF CORRECTION

PATENT NO. : 5,985,054
DATED : November 16, 1999
INVENTOR(S) : TANIBUCHI, et al

It is certified that error appears in the above-indentified patent and that said Letters Patent is hereby corrected as shown below:

Column 13, claim 1, line 43, after "acicular" insert --age--.

Signed and Sealed this

Twenty-seventh Day of March, 2001

Attest:

NICHOLAS P. GODICI

Attesting Officer

Acting Director of the United States Patent and Trademark Office